United States Patent

[11] 3,578,119

| [72] | Inventor | Jean G. M. Auriol |
| | | Billancourt, France |
| [21] | Appl. No. | 824,428 |
| [22] | Filed | May 14, 1969 |
| [45] | Patented | May 11, 1971 |
| [73] | Assignee | Regie Nationale Des Usines Renault |
| | | Billancourt, France |
| [32] | Priority | May 22, 1968 |
| [33] | | France |
| [31] | | 152779 |

[54] MULTIDISK CLUTCHES
2 Claims, 5 Drawing Figs.

[52] U.S. Cl. .................................................. 192/70.14,
192/70.23
[51] Int. Cl. ...................................................F16d 13/38,
F16d 69/00
[50] Field of Search........................................ 192/52,
70.14, 70, 23, 107

[56]    References Cited
UNITED STATES PATENTS

| 2,050,426 | 8/1936 | Dolan............................ | 192/52 |
| 2,208,111 | 7/1940 | Backstrom ................... | 192/52 |
| 2,351,996 | 6/1944 | Morgan........................ | 192/70.23(X) |
| 2,954,858 | 10/1960 | Schick........................... | 192/70.14 |
| 3,285,372 | 11/1966 | Rossmann..................... | 188/72.2 |

*Primary Examiner*—Allan D. Hermann
*Attorney*—Stevens, Davis, Miller and Mosher

ABSTRACT: Clutch mechanisms comprising a plurality of axially movable discs alternatively rotatably solid with two concentric members, wherein a thrust element coacts with the pressure plate of the discs, characterized in that the registering faces of two adjacent discs are formed with cooperating surface portions concentric to the disc axis but not parallel to the opposite face of the same disc.

INVENTOR
JEAN G.M. AURIOL

By Stevens, Davis, Miller & Mosher
ATTORNEYS ial section of a multidisc clutch
MULTIDISK CLUTCHES This invention relates to multidisc clutch mechanisms and has specific reference to a device of this character wherein the discs are axially movable and alternatively rotatably solid with two concentric members, and wherein a thrust element coacts with the clutch disc pressure plate.

This invention is concerned with an improvement intended for increasing the torque transmitted by the clutch mechanism by using particularly simple means.

It is known that the torque which can be transmitted through a multidisc clutch is determined by the mean diameter of the disc faces in mutual contact, by the pressure exerted by the thrust element against the pressure plate and by the total number of discs.

In most instances the disc diameter and the pressure of the thrust element are limited by the three-dimension space available and by the maximum permissible pressure between the disc faces.

It is also known that it is not possible to abnormally increase the number of discs in a clutch for each disc transmits to the adjacent disc the pressure force received from the thrust element minus the longitudinal frictional force or resistance developed between the disc dogs and the corresponding splines formed in the disc-supporting members.

It is the object of the present invention to provide a multidisc clutch mechanism characterized by an arrangement such that the longitudinal frictional force developed during the clutch operation is utilized for increasing the pressure force between the discs instead of reducing this force.

To this end, the clutch mechanism according to this invention is characterized in that the registering faces of only two adjacent discs of the set are formed with flat surface portions concentric to the shaft and not parallel to the opposite face of the same disc.

A typical form of embodiment of a clutch according to this invention will now be described by way of illustration with reference to the accompanying drawing, in which.

Figure 1:
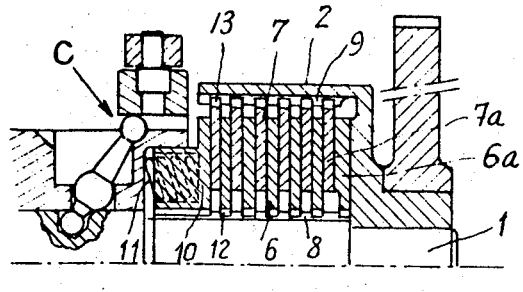
FIG. 1 is a fragmentary radial section of a multidisc clutch mechanism constructed according to the teachings of this invention.

The multidisc mechanism partially shown in the drawing comprises two sets of discs denoted 6 and 7 respectively; these sets are alternatively mounted on, and rotatably solid with, a shaft 1 and a corresponding bell-shaped member 2, by means of dogs 12, 13 engaging splines 8 and 9 formed on said shaft 1 and bell-shaped member 2, respectively. These discs can be clamped between the bottom of said bell-shaped member and a pressure plate 10 driven by means of a thrust device which may be of any conventional mechanical (i.e. of the cam, spring or lever type), hydraulic, pneumatic or electric (electromagnet) type. The thrust device illustrated herein is of the mechanical type comprising springs 11 responsive to control means C adapted to compress these springs.

The specific configuration of two of the discs mentioned hereinabove is preferably provided on the discs 6a and 7a remotest from the pressure plate 10.

Figure 2:
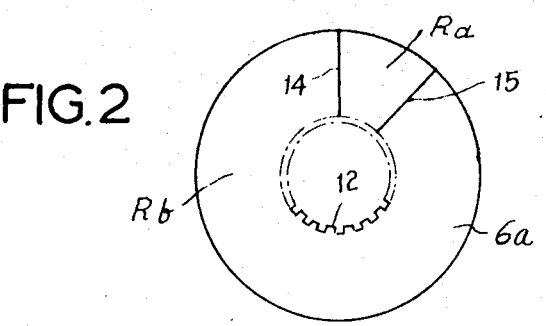
FIG. 2 is a front view of one of the inner discs of the clutch of FIG. 1.
Figure 3:
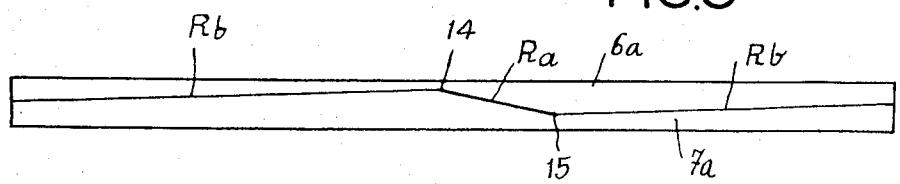
FIG. 3 is a developed side view of a pair of adjacent discs, wherein one of the registering faces is the one shown in FIG. 2.

Thus, in the example illustrated in FIGS. 2 and 3 the registering faces of these two discs comprise each an inclined cam face $Ra$ of relatively short angular or circumferential amplitude, bounded by edges 14 and 15, and a moderately inclined connecting flat cam face $Rb$ or ramp $Rb$ extending circumferentially between said edges, the cam faces and ramps of these two discs having conjugate profiles.

Figure 4:
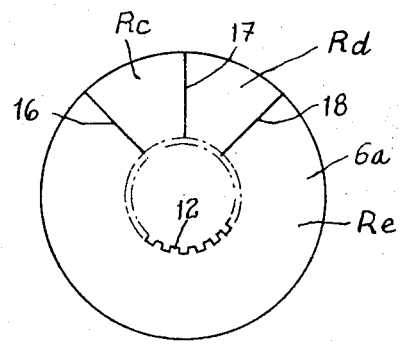
FIG. 4 is a view similar to FIG. 2 showing another form of embodiment of one of the inner discs of the clutch shown in FIG. 1.
Figure 5:
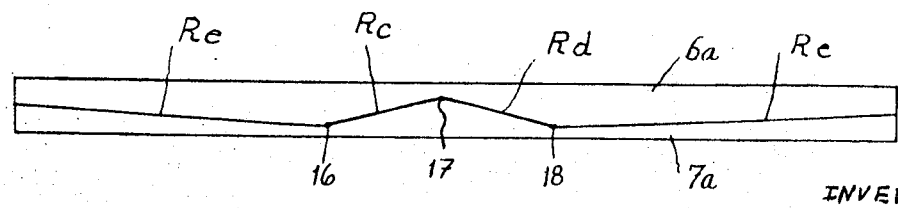
FIG. 5 is a developed side view of two discs, wherein one of the registering faces is the one shown in FIG. 4.

In the example illustrated in FIGS. 4 and 5, the registering faces of the two discs concerned comprise each two symmetrical adjacent flat cam faces $Rc$, $Rd$ bounded by edges 16, 17 and 18 having an angular amplitude considerably smaller, than that of a double a complementary connecting flat cam face or ramp $Re$ extending circumferentially between the edges 16 and 18, the cam faces and ramps of the two discs having similarly conjugate profiles.

This clutch operates as follows:

When the pressure plate 10 is allowed to engage the clutch by clamping the discs 6, 7 under the pressure of springs 11, the driving torque is transmitted from the shaft 1 or bell-shaped member 2, and the disc 7a, due to the action produced by said cam faces, exerts a counter-thrust in a direction opposed to that of said springs.

More particularly, initially the successive straight faces of the camless discs are subjected to the pressure springs 11 minus the sum of the longitudinal frictional resistance produced between the dogs of each discs and the splines engaged thereby, until the cam faces formed on the discs 6a and 7a remotest from the pressure plate create a longitudinal or axial reaction opposed to the spring force, so that the set of discs is moved or tends to move in a direction opposed to the spring force.

The pressure exerted on said straight faces will thus exceed the force of said springs by a value equal to the sum of the thus overcome longitudinal frictional resistances of the disc dogs in the splines. As a consequence, the disc compression force and possibly the spring compression, and therefore the spring force, are increased to a substantial degree. The passive resistances constituting a negative factor in conventional clutches are utilized for increasing the useful pressure between the discs, instead of reducing this pressure.

With this arrangement it is also possible to increase, without any inconvenience, the number of discs in order to increment the transmitted torque.

By way of indication, the counter-thrust obtained with the device this invention will increase from 30 to 40 percent the value of the transmitted torque in relation to a conventional multidisc clutch.

I claim:

1. An improvement in clutch mechanism comprising a plurality of axially movable discs alternately rotatable solid with two concentric members and a thrust element coacting with a pressure plate for the discs, said improvement comprising registering faces on the two adjacent discs most remote from the pressure plate, said registering faces having conjugate profiled surface portions concentric with the disc axis but not parallel to the opposite face of the same disc, said surface portions each defining a cam face of relatively small angular amplitude.

2. An improvement in clutch mechanisms according to claim 1 wherein the two registering faces of said two adjacent discs are each formed with two circumferentially symmetrical flat cam faces of relatively small angular amplitude.